(12) United States Patent  
Takahashi et al.

(10) Patent No.: US 9,733,712 B2  
(45) Date of Patent: Aug. 15, 2017

(54) DEVICE, METHOD, AND STORAGE MEDIUM STORING PROGRAM

(75) Inventors: Kousuke Takahashi, Yokohama (JP); Keiichi Nagoshi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 41 days.

(21) Appl. No.: 13/597,769

(22) Filed: Aug. 29, 2012

(65) Prior Publication Data

US 2013/0050120 A1 Feb. 28, 2013

(30) Foreign Application Priority Data

Aug. 29, 2011 (JP) .................. 2011-186634  
Aug. 29, 2011 (JP) .................. 2012-186615  
Aug. 29, 2012 (JP) .................. 2012-188757  
Aug. 29, 2012 (JP) .................. 2012-188774

(51) Int. Cl.
  G06F 3/041 (2006.01)
  G06F 3/01 (2006.01)
  G06F 3/0488 (2013.01)

(52) U.S. Cl.
  CPC .......... *G06F 3/017* (2013.01); *G06F 3/04883* (2013.01); *G06F 2203/0381* (2013.01)

(58) Field of Classification Search
  CPC ...................................... G06F 3/041
  USPC .......................................... 345/173
  See application file for complete search history.

(56) References Cited

U.S. PATENT DOCUMENTS

| | | | |
|---|---|---|---|
| 5,856,822 A * | 1/1999 | Du | G06F 3/03547 345/157 |
| 7,469,381 B2 | 12/2008 | Ording | |
| 7,479,949 B2 | 1/2009 | Jobs et al. | |
| 7,932,882 B2 | 4/2011 | Shimotono et al. | |
| 8,209,606 B2 | 6/2012 | Ording | |
| 8,255,798 B2 | 8/2012 | Ording | |
| 8,312,371 B2 | 11/2012 | Ording | |
| 8,365,090 B2 | 1/2013 | Ording | |
| 8,570,345 B2 | 10/2013 | Fujimoto et al. | |
| 8,649,973 B2 | 2/2014 | Kawaguchi et al. | |
| 2008/0165160 A1 | 7/2008 | Kocienda et al. | |
| 2009/0070705 A1 | 3/2009 | Ording | |
| 2010/0088639 A1* | 4/2010 | Yach et al. | 715/825 |
| 2010/0197352 A1* | 8/2010 | Runstedler et al. | 455/566 |

(Continued)

FOREIGN PATENT DOCUMENTS

JP  2003-344059 A  12/2003  
JP  2008-139711 A  6/2008

(Continued)

OTHER PUBLICATIONS

Office Action mailed Apr. 21, 2015, corresponding to Japanese patent application No. 2012-188774, for which an explanation of relevance is attached.

(Continued)

*Primary Examiner* — Antonio Xavier  
*Assistant Examiner* — Shawna Stepp Jones  
(74) *Attorney, Agent, or Firm* — Hauptman Ham, LLP (57) ABSTRACT

According to an aspect, a device includes a touch screen display and a controller. The touch screen display displays a screen. The controller controls an orientation of the screen based on a gesture detected through the touch screen display and a state of the device.

20 Claims, 8 Drawing Sheets

(56) References Cited

U.S. PATENT DOCUMENTS

| | | | |
|---|---|---|---|
| 2011/0007095 A1* | 1/2011 | Fujimoto | G06F 1/1626 345/650 |
| 2012/0056830 A1* | 3/2012 | Suzuki et al. | 345/173 |
| 2013/0120256 A1 | 5/2013 | Ishidera et al. | |
| 2013/0265250 A1* | 10/2013 | Ishikawa | G06F 3/041 345/173 |

FOREIGN PATENT DOCUMENTS

| | | |
|---|---|---|
| JP | 2009-224896 A | 10/2009 |
| JP | 2010-515978 A | 5/2010 |
| JP | 2011-23005 A | 2/2011 |
| WO | 2008086302 A1 | 7/2008 |
| WO | 2009/151037 A1 | 12/2009 |
| WO | 2012/004852 A1 | 1/2012 |

OTHER PUBLICATIONS

Office Action mailed Mar. 17, 2015, corresponding to Japanese patent application No. 2012-188757, for which an explanation of relevance is attached.

Tio, How to use perfect viewer, Feb. 4, 2011, online<URL:http://www.amedama.com/blog/20110204250.html>.

Yuko Tanaka, iPAD X Business Perfect Bible, Jan. 11, 2011, p. 13, First edition, Shoeisha Co., Ltd.

Office Action mailed Dec. 1, 2015, corresponding to Japanese Patent Application No. 2012-188774 for which an explanation of relevance is attached.

* cited by examiner

DEVICE, METHOD, AND STORAGE MEDIUM STORING PROGRAM

CROSS-REFERENCE TO RELATED APPLICATIONS

This application claims priority from Japanese Application No. 2011-186615, filed on Aug. 29, 2011, Japanese Application No. 2011-186634, filed on Aug. 29, 2011, Japanese Application No. 2012-188757, filed on Aug. 29, 2012, and Japanese Application No. 2012-188774, filed on Aug. 29, 2012, the contents of which are incorporated by reference herein in their entireties.

BACKGROUND

1. Technical Field

The present disclosure relates to a device, a method, and a storage medium storing therein a program. More particularly, the present application relates to a device including a touch screen display, a method of controlling the device, and a storage medium storing therein a program for controlling the device.

2. Description of the Related Art

A touch screen device having a touch screen display has been known. Examples of the touch screen devices include, but are not limited to, a smartphone and a tablet. The touch screen device detects a gesture of a finger, a pen, or a stylus pen through the touch screen display. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Many touch screen devices is configured to change the orientation of a screen depending on the detection of a sensor. However, the touch screen devices sometimes display the screen of an unintended orientation.

For the foregoing reasons, there is a need for a device, a control method, and a control program, which can display the screen of the orientation that is intended by a user.

SUMMARY

According to an aspect, a device includes a touch screen display and a controller. The touch screen display displays a screen. The controller controls an orientation of the screen based on a gesture detected through the touch screen display and a state of the device.

According to another aspect, a method is for controlling a device including a touch screen display. The control method includes: displaying a screen on the touch screen display; detecting a state of the device; and when a gesture with respect to the touch screen display is detected, changing an orientation of the screen of the touch screen display depending on the state of the device.

According to another aspect, a non-transitory storage medium stores a program. When executed by a device including a touch screen display, the program causes the device to execute: displaying a screen on the touch screen display; detecting a state of the device; and when a gesture with respect to the touch screen display is detected, changing an orientation of the screen of the touch screen display depending on the state of the device.

DETAILED DESCRIPTION

Exemplary embodiments of the present invention will be explained in detail below with reference to the accompanying drawings. A smartphone will be explained below as an example of a device provided with a touch screen display.

Figure 1:
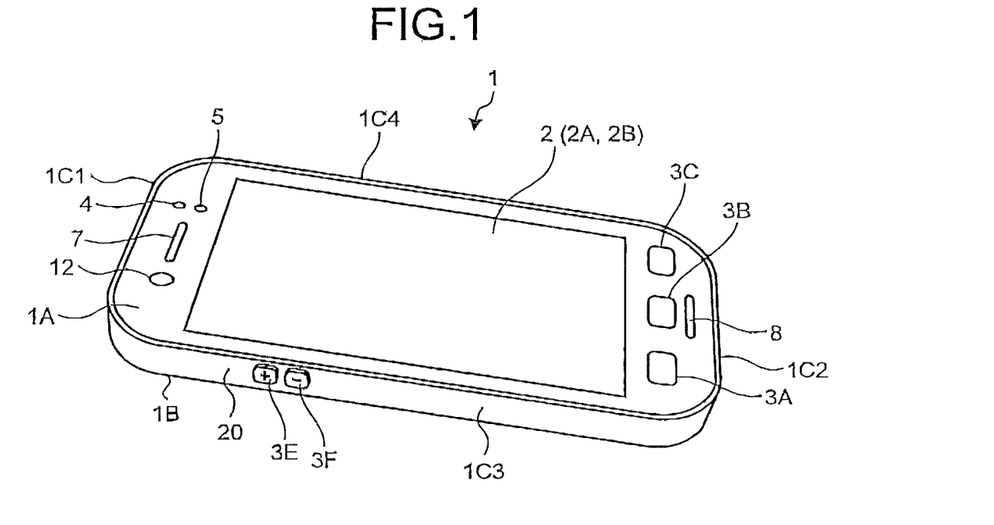
FIG. 1 is a perspective view of a smartphone according to an embodiment.
Figure 2:
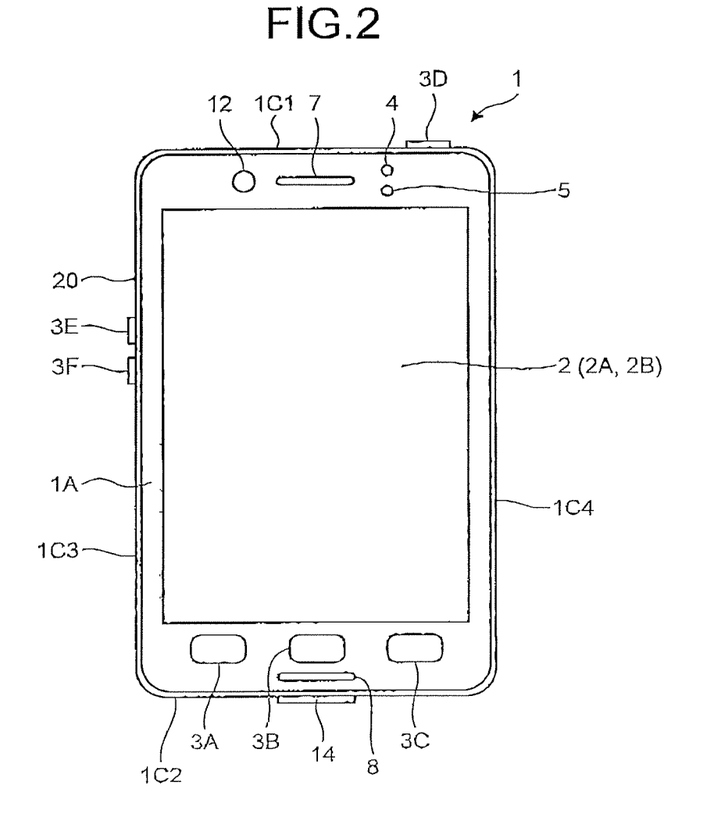
FIG. 2 is a front view of the smartphone.
Figure 3:
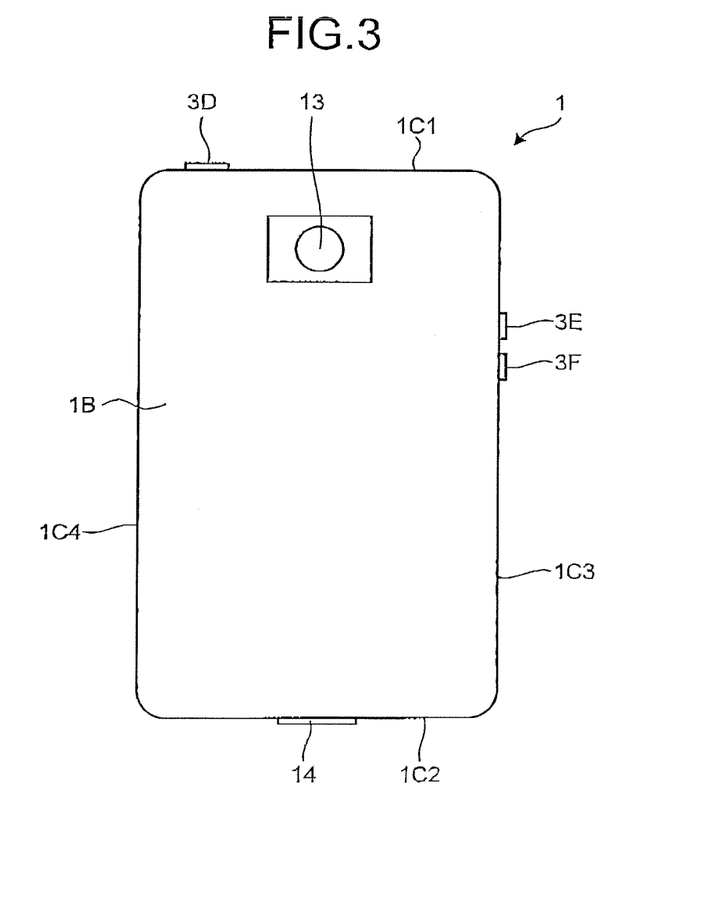
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a camera 13, which is provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
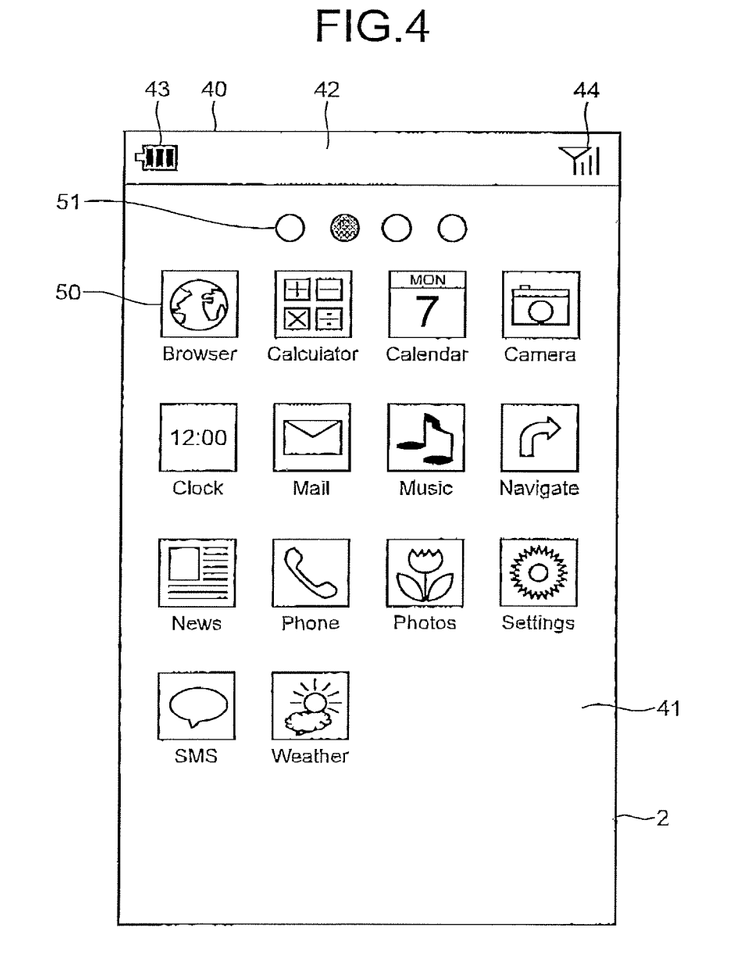
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
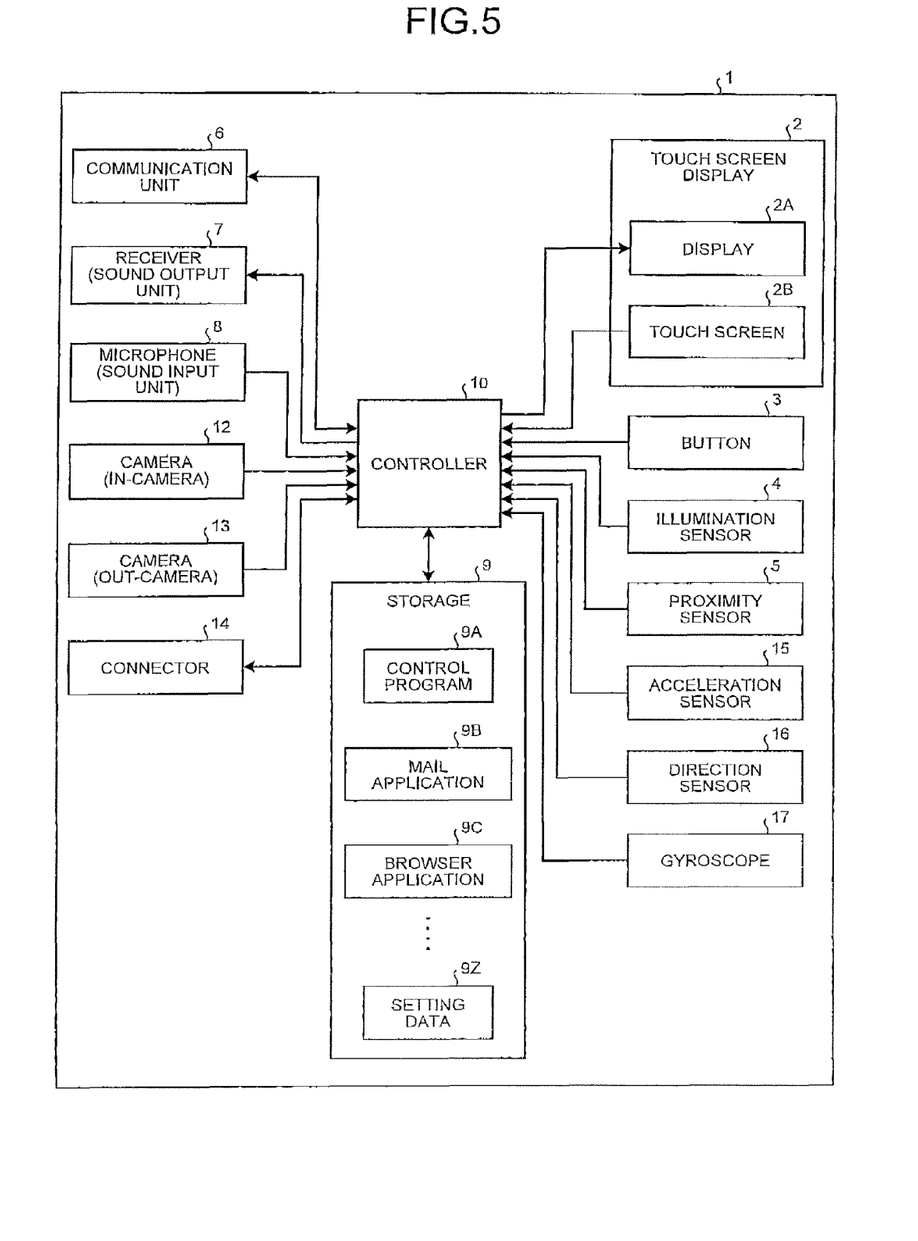
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 is a sound output unit. The receiver 7 outputs a sound signal transmitted from the controller 10 as sound. The receiver 7 is used, for example, to output voice of the other party on the phone. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semi-conductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, and setting data 9Z. The mail application 9B provides e-mail functions for composition, transmission, reception, display, and the like of an e-mail. The browser application 9C provides WEB browsing functions for displaying WEB pages. The setting data 9Z includes information on various settings for operation of the smartphone 1.

The control program 9A provides various control functions for operating the smartphone 1. The control program 9A realizes communications by controlling, for example, a communication unit 6, a receiver 7, a microphone 8, and the like. The control program 9A includes a function of controlling the change of an orientation of a screen displayed on the display 2A based on a gesture detected through a touch screen 2B and a state of a smartphone 1. A function provided by the control program 9A may be combined and used with a function provided by another program such as a mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, and the receiver 7. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 performs, for example, a control for changing an orientation of a screen displayed on the display 2A based on a gesture detected through the touch screen 2B and the state of the smartphone 1 through execution of the control program 9A.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The smartphone 1 can detect an inclination of the smartphone 1 through the acceleration sensor 15. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9.

Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

An example of the control based on the function provided by the control program 9A will be described with reference to FIGS. 6 and 7. A function of changing an orientation of a home screen according to a user's instruction is included in functions provided by the control program 9A. Hereinafter, an example of changing the orientation of the home screen according to the user's instruction will be described. The smartphone 1 illustrated in FIG. 6 has an angle of inclination (pitch) that is smaller than a threshold value with respect to a horizontal direction. The angle of inclination (pitch) with respect to the horizontal direction is, for example, an angle between the surface of the touch screen display 2 and the horizontal direction. The threshold value may be 45 degrees. When threshold value is set to 45 degrees, it is possible to appropriately determine whether the smartphone 1 is in an inclined state.

Figure 6:
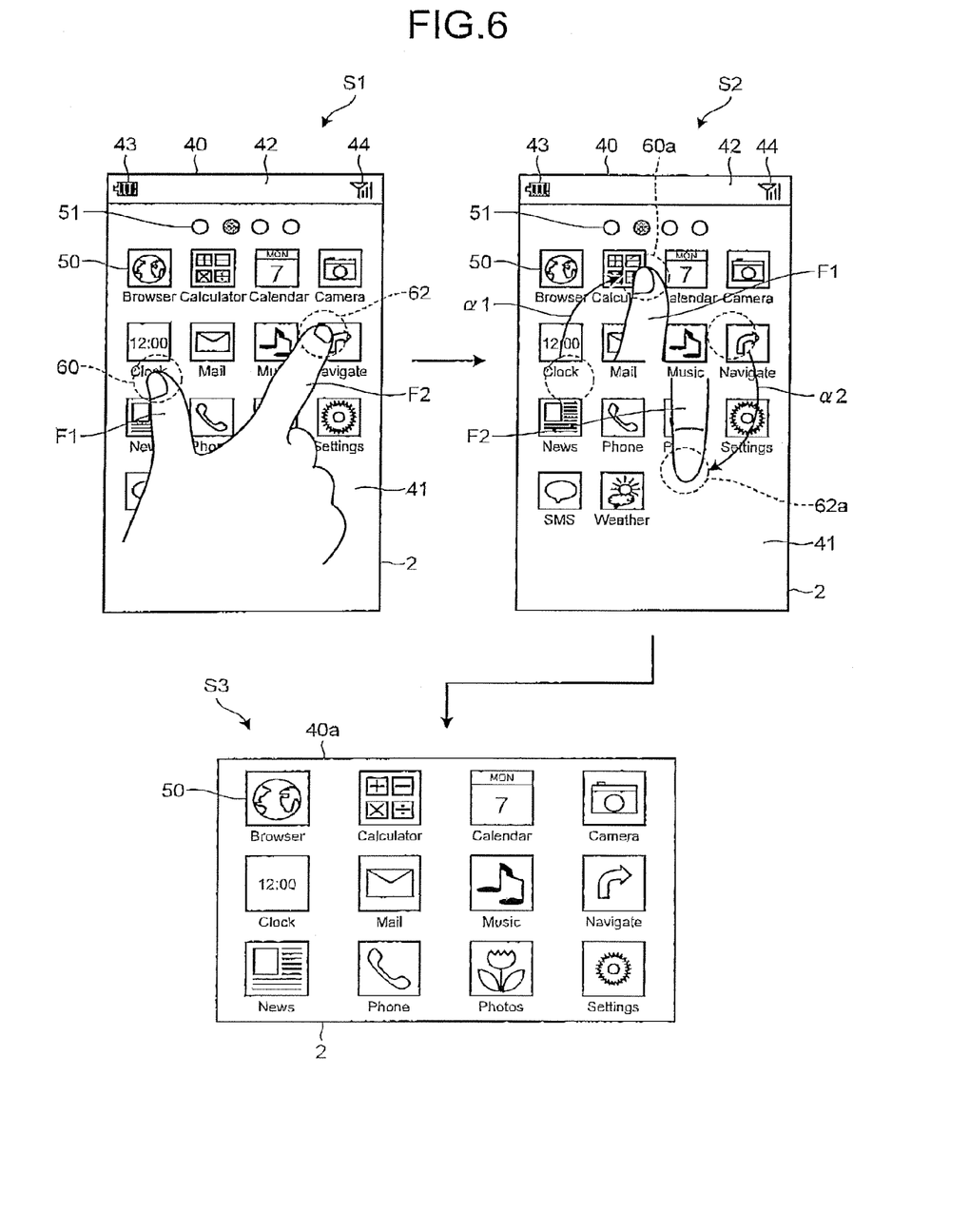
FIG. 6 is a diagram illustrating an example of a control for changing the orientation of a screen.

At Step S1 illustrated in FIG. 6, a home screen 40 is displayed on a display 2A. On the home screen 40 displayed at Step S1, a plurality of icons 50 are displayed. At Step S1, a user's finger F1 touches an area 60 in a display area of a wall paper 41, and a user's finger F2 touches an area 62 in the display area of the wall paper 41. The finger F1 is a user's right hand thumb. The finger F2 is a user's right hand forefinger. In this case, the smartphone 1 detects a touch in the area 60 and a touch in the area 62 through a touch screen 2B.

At Step S2, the user's fingers F1 and F2 swipe in the direction where both the fingers F1 and F2 draw an arc clockwise on the touch screen display 2. That is, the user swipes the finger F1 that touches the area 60 to an area 60*a* through a path indicated by an arrow α1. The user swipes the finger F2 that touches the area 62 to an area 62*a* through a path indicated by an arrow α2. The user only have to swipe the finger F1 and the finger F2 while the two fingers F1 and F2 are touching the touch screen display 2, and the swipe of the finger F1 and the swipe of the finger F2 may be performed simultaneously or individually. In this case, the smartphone 1 detects a swipe that moves from the area 60 to the area 60*a* through the path indicated by the arrow α1 and a swipe that moves from the area 62 to the area 62*a* through the path indicated by the arrow α2 through the touch screen 2B. Hereinafter, such a swipe may also be called a "rotary gesture".

At Step S3, the user's fingers F1 and F2 are released from the touch screen display 2. In this case, the smartphone 1 detects an end of the rotary gesture. The rotary gesture may be ended through stopping of the swipe of the user's fingers F1 and F2. When the rotary gesture is detected, the smartphone 1 changes the orientation of the home screen as illustrated at Step S3. Specifically, the smartphone 1 displays a home screen 40*a*, which is obtained by rotating the home screen 40 by 90 degrees clockwise, on the touch screen display 2. That is, the smartphone 1 changes the home screen 40*a* from a vertical screen (portrait screen) to a horizontal screen (landscape screen). Then, icons 50 are rearranged on the home screen 40.

The smartphone 1 sets the rotary gesture as a gesture to change the orientation of the home screen displayed on the display 2A. When the angle of inclination (pitch) with respect to the horizontal direction is smaller than the threshold value and the rotary gesture is detected, the smartphone 1 changes the orientation of the home screen 40.

As described above, when the gesture to change the orientation of the home screen (in this embodiment, the gesture to rotate the home screen) is detected through the touch screen 2B, the smartphone 1 changes the orientation of the home screen based on the gesture to change the orientation of the home screen detected through the touch screen 2B. Accordingly, a user can rotate the orientation of the screen, that is, a user can rotate the screen, which is displayed on the display 2A through an input of the rotary gesture.

The gesture to change the orientation of the home screen displayed on the display 2A is not limited to the rotary gesture. The smartphone 1 may take another gesture such as "flick", "pinch in", and "pinch out" as a gesture to change the orientation of the home screen.

The smartphone 1 may determine a direction and an angle of a rotation of the orientation of the home screen based on the gesture to change the orientation of the home screen. For example, when a swipe of an arc rotating clockwise is detected, the smartphone 1 rotates and changes the orientation of the screen clockwise, and when a swipe of an arc rotating counterclockwise is detected, the smartphone 1 rotates and changes the orientation of the screen counterclockwise. When the detected swipe of the arc is the arc of 90 degrees, the smartphone 1 rotates the orientation of the screen by 90 degrees, and when the detected swipe of the arc is the arc of 180 degrees, the smartphone 1 rotates the orientation of the screen by 180 degrees. The smartphone 1 may change the orientation of the screen in the unit of 90 degrees. That is, the smartphone 1 may limit the orientations of the screen to four orientations that are rotated 0 degree, 90 degrees, 180 degrees, and 270 degrees from the standard orientation. The smartphone 1 may rotate the orientation of the screen at an arbitrary angle, for example, at the same angle as the arc of the detected swipe.

Incidentally, when the angle of inclination of the touch screen display 2 with respect to the horizontal direction is not within a threshold range, that is, when the angle of inclination of the touch screen display 2 with respect to the horizontal direction is not smaller than the threshold angle value, the smartphone 1 changes the orientation of the screen based on the inclination of the smartphone 1 that is detected through an acceleration sensor 15, specifically, the orientation of the face of the display 2B of the touch screen display 2 on which the image is displayed. The smartphone 1 according to the embodiment displays the home screen in an orientation in which a side of the touch screen display 2 that is the lowermost side in the vertical direction and is nearer to a horizontal direction corresponds to a lower side of the screen, based on the inclination of the smartphone 1 detected by the acceleration sensor 15. Accordingly, the user can change the orientation of the home screen by changing the orientation of the smartphone 1. The user can make the home screen displayed in the orientation in which the lower side of the touch screen display 2 in the vertical direction corresponds to the lower side of the screen.

An example of the processing procedure of a control based on the function provided by the control program 9A will be described with reference to FIG. 7. FIG. 7 illustrates the processing procedure of a control for changing the orientation of the home screen according to a user's instruction. The processing procedure illustrated in FIG. 7 is realized by a controller 10 that executes the control program 9A. The processing procedure illustrated in FIG. 7 is repeatedly executed while the home screen 40 is displayed on the display 2A. The controller 10 may execute another processing procedure for control about the home screen 40 in parallel to the processing procedure illustrated in FIG. 19.

At Step S12, the controller 10 determines whether or not a gesture to change the orientation of the home screen has been detected, that is, whether or not a gesture for a home screen rotate has been detected. That is, the controller 10 determines whether or not a gesture to change the orientation of the screen has been detected through the touch screen 2B. When it is determined that the gesture to change the orientation of the screen has not been detected at Step S12 ("No" at Step S12), the controller 10 terminates the process.

When it is determined that a gesture to change the orientation of the screen has been detected at Step S12 ("Yes" at Step S12), the controller 10, at Step S14, acquires the detection result from the acceleration sensor 15, and determines whether or not the angle of inclination of the smartphone 1 with respect to the horizontal direction is smaller than the threshold value based on the acquired detection result.

When it is determined that the angle is smaller than the threshold value at Step S14 ("Yes" at Step S14), that is, when it is determined that the screen of the touch screen display 2 is near to the horizontal direction, the controller 10 changes the determined orientation of the home screen at Step S16. Specifically, the controller 10 determines the orientation of the home screen, that is, the direction and the angle of the rotation of the home screen, based on the gesture to change the orientation of the home screen that is detected and determined at Step S12, and displays the home screen in the determined orientation.

When it is determined that the angle of inclination of the smartphone 1 with respect to the horizontal direction is not smaller than the threshold angle value at Step S14 ("No" at Step S14), that is, when it is determined that the screen of the touch screen display 2 is near to the vertical direction, the controller 10 terminates the process. That is, the controller 10 terminates the process without rotating the screen even if the gesture to rotate the screen is detected.

As described above, the smartphone 1 changes the orientation of the home screen based on the gesture to change the orientation of the home screen in the case where the angle of inclination of the touch screen display 2 with respect to the horizontal direction is smaller than the threshold angle value. Accordingly, the smartphone 1 can change the orientation of the home screen to the orientation desired by the user even in the case where the angle of inclination is near to the horizontal direction and thus it is difficult to judge which side is a lower side with respect to the vertical direction. For example, when the user desires to change the orientation of the home screen in a state where the smartphone 1 is put on a desk and thus the inclination of the smartphone 1 is near to the horizontal direction, the user can change the orientation of the home screen by only inputting the gesture to change the orientation of the home screen onto the touch screen display 2, without the necessity of tipping the touch screen display 2 once through lifting of the smartphone 1.

The smartphone 1 may change the orientation of the screen when a change in the inclination of the smartphone 1 is detected in a state where the angle of inclination of the touch screen display 2 with respect to the horizontal direction is not smaller than the threshold value.

Specifically, when the angle of inclination of the touch screen display 2 with respect to the horizontal direction is not smaller than the threshold value, the controller 10 of the smartphone 1 determines whether there is a change of the inclination of the smartphone 1. More specifically, the controller 10 detects the inclination of the smartphone 1 based on the detection result from the acceleration sensor 15, and determines whether or not there is a change that is larger than the set value with respect to the standard inclination. The standard inclination may be set in various ways. For example, the standard inclination may be set based on the orientation of the screen that is displayed on the display 2B. The set value is a threshold of the inclination a change larger than which causes a change of the orientation of the screen. The set value may be an angle of the inclination of the smartphone 1 at which the orientation of the screen is changed up to an orientation that is not suitable for displaying the screen.

When it is determined that the inclination of the smartphone 1 is not changed, that is, the inclination of the smartphone 1 is not changed up to the threshold value that necessitates the change of the orientation of the screen, the controller 10 does not change the orientation of the screen. When it is determined that the inclination of the smartphone 1 is changed, that is, when it is determined that the inclination of the smartphone 1 is changed up to the threshold value that necessitates the change of the orientation of the screen, the controller 10 changes the orientation of the home screen. Specifically, the controller 10 determines the orientation of the home screen, that is, the direction and the angle of the rotation of the home screen, based on the determined inclination of the smartphone 1, and displays the home screen in the determined orientation.

Accordingly, the user can display the home screen in the orientation in which the lower side of the touch screen display 2 in the vertical direction corresponds to the lower side of the home screen, without inputting a gesture. Basically, the smartphone 1 can change the orientation of the home screen with two operations, that is, an operation to change the inclination of the smartphone 1 and a gesture to change the orientation of the home screen. Accordingly, the user can change the orientation of the home screen with a simple operation.

According to the smartphone 1 as described above, the user can change the orientation of the home screen with a simple operation, and can limit the change of the orientation of the home screen that is not intended by the user.

Figure 7:
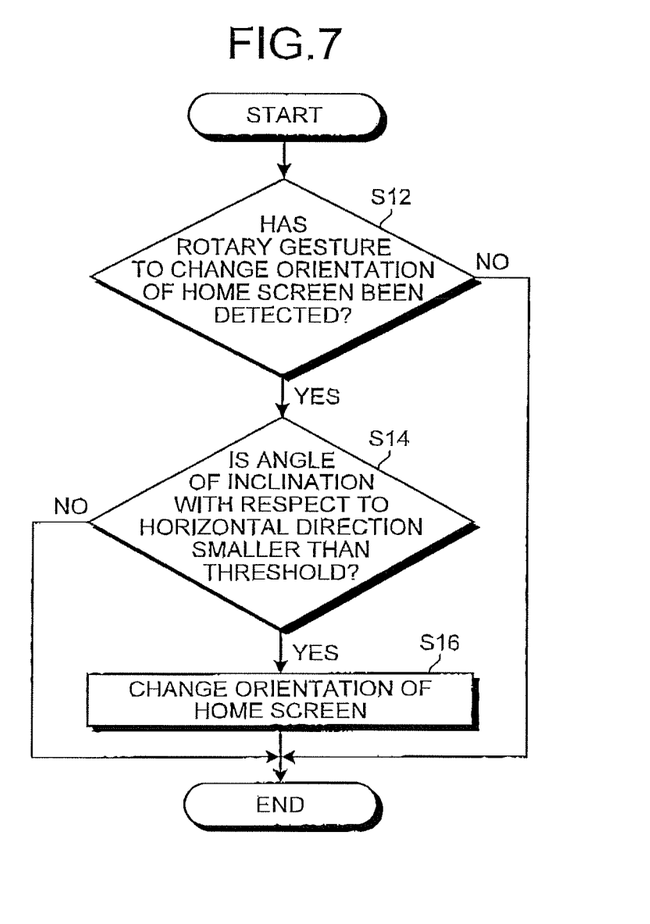
FIG. 7 is a flowchart illustrating a control processing procedure for changing the orientation of a screen.

In the processing procedure illustrated in FIG. 7, when the angle of inclination of the smartphone 1 with respect to the horizontal direction is not smaller than the threshold angle value, the smartphone 1 may not determine whether the gesture to change the orientation of the home screen has been detected. That is, when the angle of inclination of the smartphone 1 with respect to the horizontal direction is not smaller than the threshold angle value, the smartphone 1 may stop the function of changing the orientation of the home screen based on the gesture to change the orientation of the home screen. Accordingly, the smartphone 1 can detect an appropriate operation as the operation to change the orientation of the home screen depending on the attitude of the smartphone 1.

The smartphone 1 performs the process of FIG. 7 in the case where the home screen as illustrated in FIG. 6 is displayed; therefore, the user can simply change the orientation of the home screen and limit the change of the orientation of the home screen in the direction unintended by the user. Even in the case where a screen other than the home screen 40 is displayed on the display 2A of the touch screen display 2, the smartphone 1 may perform the process of FIG. 7. Accordingly, even in the case where the screen other than the home screen 40 is displayed, the user can simply change the orientation of the home screen, and limit the change of the orientation of the home screen in the orientation unintended by the user.

In the embodiment, the smartphone 1 detects the inclination of the smartphone 1 based on the detection result from the acceleration sensor 15; however the detection manner is not limited thereto. The smartphone 1 may use various sensors as the sensor to detect the inclination of the smartphone 1. For example, the smartphone 1 may detect the inclination of the smartphone 1 based on at least one of the detection result of the gyroscope 17 and the detection result of the direction sensor 16.

Another example of the control based on the function provided by the control program 9A will be described with reference to FIGS. 8 and 9. A function of changing an orientation of a home screen according to a user's instruction is included in functions provided by the control program 9A. Hereinafter, an example of changing the orientation of the home screen according to the user's instruction will be described.

Figure 8:
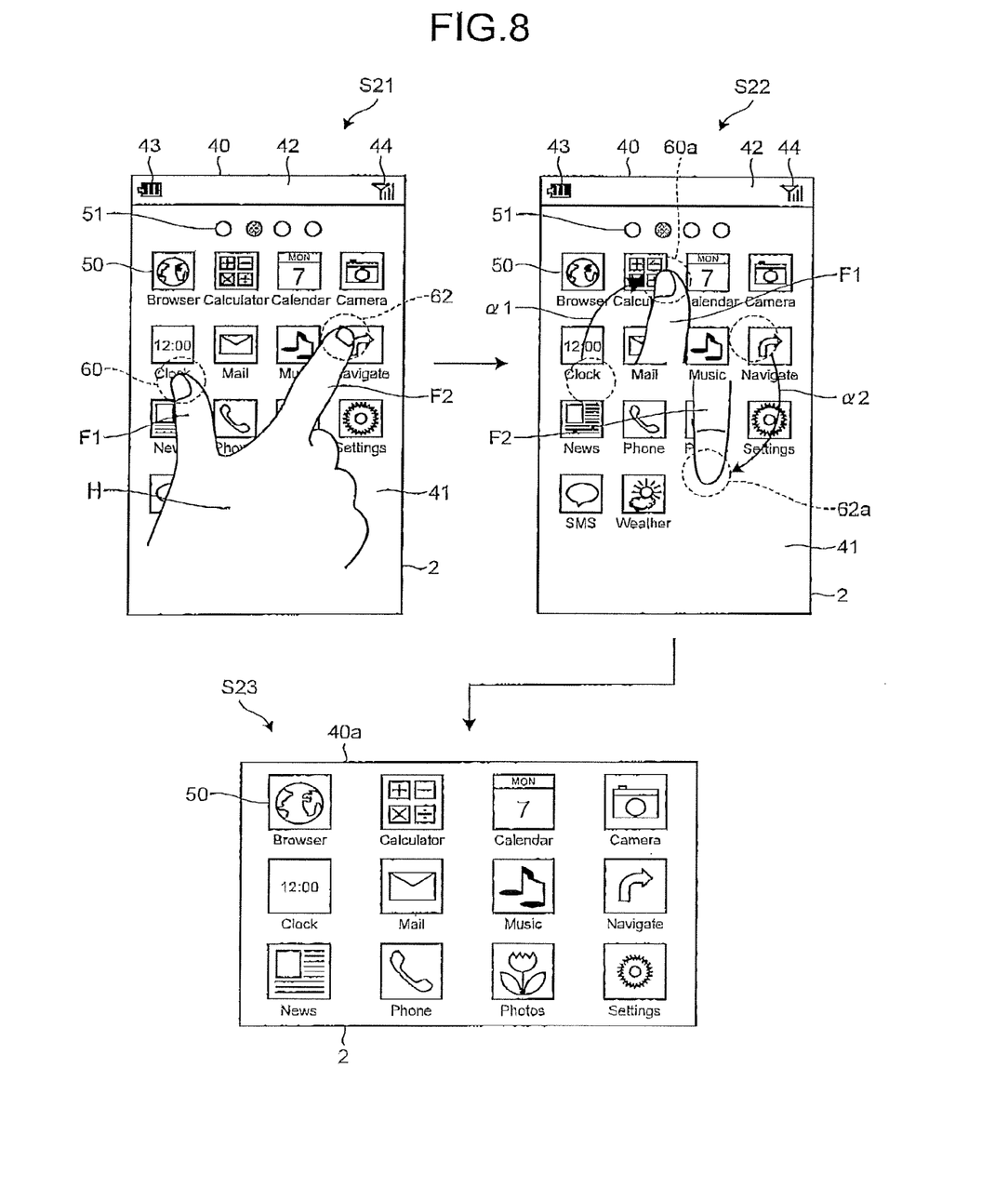
FIG. 8 is a diagram illustrating an example of another control for changing the orientation of a screen.

At Step S21 illustrated in FIG. 8, a home screen 40 is displayed on a display 2A. On the home screen 40 displayed at step S21, a plurality of icons 50 are arranged. At Step S21, a user's finger F1 touches an area 60 in a display area of a wall paper 41, and a user's finger F2 touches an area 62 in the display area of the wall paper 41. The finger F1 is a user's right hand thumb. The finger F2 is a user's right hand forefinger. In this case, the smartphone 1 detects a touch in the area 60 and a touch in the area 62 through a touch screen 2B.

At Step S22, the user's fingers F1 and F2 swipe in the orientation where both the fingers F1 and F2 draw an arc clockwise on the touch screen display 2. That is, the user swipes the finger F1 that touches the area 60 to an area 60a through a path indicated by an arrow α1. The user swipes the finger F2 that touches the area 62 to an area 62a through a path indicated by an arrow α2. The user only have to swipe the finger F1 and the finger F2 while the two fingers F1 and F2 are touching the touch screen display 2, and the swipe of the finger F1 and the swipe of the finger F2 may be performed simultaneously or individually. In this case, the smartphone 1 detects the swipe that moves from the area 60 to the area 60a through the path indicated by the arrow α1 and the swipe that moves from the area 62 to the area 62a through the path indicated by the arrow α2 through the touch screen 2B. Hereinafter, as mentioned above, such a swipe may also be called a "rotary gesture".

At Step S23, the user's fingers F1 and F2 are released from the touch screen display 2. In this case, the smartphone 1 detects an end of the rotary gesture. The rotary gesture may be ended through stopping of the swipe of the user's fingers F1 and F2. When the rotary gesture is detected, the smartphone 1 changes the orientation of the home screen as illustrated at Step S23. Specifically, the smartphone 1 displays a home screen 40a, which is obtained by rotating the home screen 40 by 90 degrees clockwise, on the touch screen display 2. That is, the smartphone 1 changes the home screen 40a from a vertical screen (portrait screen) to a horizontal screen (landscape screen). Then, icons 50 are rearranged on the home screen 40.

The smartphone 1 sets the rotary gesture as a gesture to change the orientation of the home screen displayed on the display 2A. When the rotary gesture is detected, the smartphone 1 changes the orientation of the home screen 40.

As described above, when the gesture to change the orientation of the home screen (in this embodiment, the gesture to rotate the home screen) is detected through the touch screen 2B, the smartphone 1 changes the orientation of the home screen based on the gesture to change the orientation of the home screen detected through the touch screen 2B. Accordingly, a user can rotate the orientation of the screen, that is, a user can rotate the screen, which is displayed on the display 2A through an input of the rotary gesture.

The gesture to change the orientation of the home screen displayed on the display 2A is not limited to the rotary gesture. The smartphone 1 may take another gesture such as "flick", "pinch in", and "pinch out" as a gesture to change the orientation of the home screen.

The smartphone 1 may determine a direction and an angle of a rotation of the orientation of the home screen based on the gesture to change the orientation of the home screen. For example, when a swipe of an arc rotating clockwise is detected, the smartphone 1 rotates and changes the orientation of the screen clockwise, and when a swipe of an arc rotating counterclockwise is detected, the smartphone 1 rotates and changes the orientation of the screen counterclockwise. When the detected swipe of the arc is the arc of 90 degrees, the smartphone 1 rotates the orientation of the screen by 90 degrees, and when the detected swipe of the arc is the arc of 180 degrees, the smartphone 1 rotates the orientation of the screen by 180 degrees. The smartphone 1 may change the orientation of the screen in the unit of 90 degrees. That is, the smartphone 1 may limit the orientations of the screen to four orientations that are rotated 0 degree, 90 degrees, 180 degrees, and 270 degrees from the standard orientation. The smartphone 1 may rotate the orientation of the screen at an arbitrary angle, for example, at the same angle as the arc of the detected swipe.

Moreover, the smartphone 1 changes the orientation of the screen that displays the image on the display 2A of the touch screen display 2 based on the inclination of the smartphone 1 detected by the acceleration sensor 15. The smartphone 1 according to the embodiment displays the home screen in an orientation in which a side of the touch screen display 2 that is the lowermost side in the vertical direction and is nearer to a horizontal direction corresponds to a lower side of the screen, based on the inclination of the smartphone 1 detected by the acceleration sensor 15. Accordingly, the user can change the orientation of the home screen by changing the orientation of the smartphone 1. The user can make the home screen displayed in the orientation in which the lower side of the touch screen display 2 in the vertical direction corresponds to the lower side of the screen.

An example of the processing procedure of another control process based on the function provided by the control program 9A will be described with reference to FIG. 9. FIG. 9 illustrates the processing procedure of a control for changing the orientation of the home screen. The processing procedure illustrated in FIG. 9 is realized by a controller 10 that executes the control program 9A. The processing procedure illustrated in FIG. 9 is repeatedly executed while the home screen 40 is displayed on the display 2A. The controller 10 may execute another processing procedure for control about the home screen 40 in parallel to the processing procedure illustrated in FIG. 9.

At Step S32, the controller 10 acquires the detection result of the touch screen 2B, and determines whether or not a gesture has been detected based on the acquired detection result. When it is determined that the gesture has not been detected at Step S32 ("No" at Step S32), the controller 10 proceeds to Step S40.

When it is determined that the gesture has been detected at Step S32 ("Yes" at Step S32), the controller 10, at Step S34, determines whether or not the gesture is a gesture to change the orientation of the home screen, that is, a gesture to rotate the home screen. That is, the controller 10 determines whether or not the gesture detected at Step S32 is a gesture to change the orientation of the screen. When it is determined that the detected gesture is not the gesture to change the orientation of the screen at Step S34 ("No" at Step S34), the controller 10 proceeds to Step S48.

When it is determined that the detected gesture is the gesture to change the orientation of the screen at Step S34 ("Yes" at Step S34), the controller 10 changes the orientation of the home screen at Step S36. Specifically, the controller 10 determines the direction and the angle of the rotation of the home screen, that is, the direction and the angle of the rotation of the home screen based on the gesture to change the orientation of the home screen, which is detected at Step S32 and is determined at Step S34, and displays the home screen in the determined orientation. When the orientation of the home screen is changed at Step S36, the controller 10 put the orientation of the home screen to be in an orientation-fixed state at Step S38, and terminates the process. The orientation-fixed state will be described later together with another processing procedure of FIG. 9.

When it is determined "No" at Step S32, the controller 10 determines a change in the inclination of the smartphone 1 at Step S40. The controller 10 detects the inclination of the smartphone 1 based on the detection result from the acceleration sensor 15. The standard inclination may be set in various ways. For example, the standard inclination may be set based on the orientation of the screen that is displayed on the display 2A. The set value is a threshold of the inclination a change larger than which causes a change of the orientation of the screen. The set value may be an angle of the inclination of the smartphone 1 at which the orientation of the screen is changed up to an orientation that is not suitable for displaying the screen.

When it is determined that the inclination of the smartphone 1 is not changed at Step S40 ("No" at Step S40), that is, the inclination of the smartphone 1 is not changed up to the threshold value that necessitates the change of the orientation of the screen, the controller 10 terminates the process.

When it is determined that the inclination of the smartphone 1 is changed at Step S40 ("Yes" at Step S40), that is, when it is determined that the inclination of the smartphone 1 is changed up to the threshold value that necessitates the change of the orientation of the screen, the controller 10 determines whether the present state is an orientation-fixed state at Step S42.

When it is determined that the present state is the orientation-fixed state at Step S42 ("Yes" at Step S42), the controller 10 terminates the process. That is, when the present state is the orientation-fixed state, the controller 10 terminates the process without changing the orientation of the home screen even if there is a change in the orientation of the touch screen display 2. When it is determined that the present state is not the orientation-fixed state at Step S42 ("No" at Step S42), the controller 10 changes the orientation of the home screen at Step S44. Specifically, the controller 10 determines the orientation of the home screen, that is, the direction and the angle of the rotation of the home screen, based on the orientation of the touch screen display 2, which is detected and determined at Step S40, and displays the home screen in the determined orientation. When the orientation of the home screen is changed at Step S44, the controller 10 terminates the process.

When it is determined "No" at Step S34, the controller 10 determines whether or not the detected gesture is a release gesture of the orientation-fixed state at Step S48. That is, the controller 10 determines whether or not the gesture detected at Step S32 is the gesture to release the orientation-fixed state. Various gestures may be set as the release gesture. For example, a long tap to a predetermined area or a swipe of a predetermined trace may be used as the release gesture.

When it is determined that the detected gesture is the release gesture at Step S48 ("Yes" at Step S48), the controller 10 releases the orientation-fixed state at Step S50, and terminates the process. That is, the controller 10 make a setting such that the orientation of the home screen is changed when there occurs a change in the orientation of the touch screen display 2, and then terminates the process.

When it is determined that the detected gesture is not the release gesture at Step S48 ("No" at Step S48), the controller 10 executes the process with respect to the detected gesture at Step S52, and terminates the process.

As described above, the smartphone 1 can change the orientation of the home screen through any one of the detection of the change of the inclination of the smartphone 1 and the gesture to change the orientation of the home screen. Accordingly the user can change the orientation of the home screen with a simple operation.

For example, by changing the orientation of the home screen based on the gesture to change the orientation of the home screen, the smartphone 1 can change the orientation of the home screen desired by the user even if it is difficult to judge whether or not the orientation of the touch screen display 2 is the horizontal direction and which side is a lower side with respect to the vertical direction.

When the change of the inclination of the smartphone 1 is detected in a state where the orientation-fixed state is not set, the smartphone 1 changes the orientation of the screen. Accordingly, the home screen can be displayed in the orientation in which the lower side of the touch screen display 2 in the vertical direction corresponds to the lower side of the home screen without the necessity of user's input of the gesture.

Figure 9:
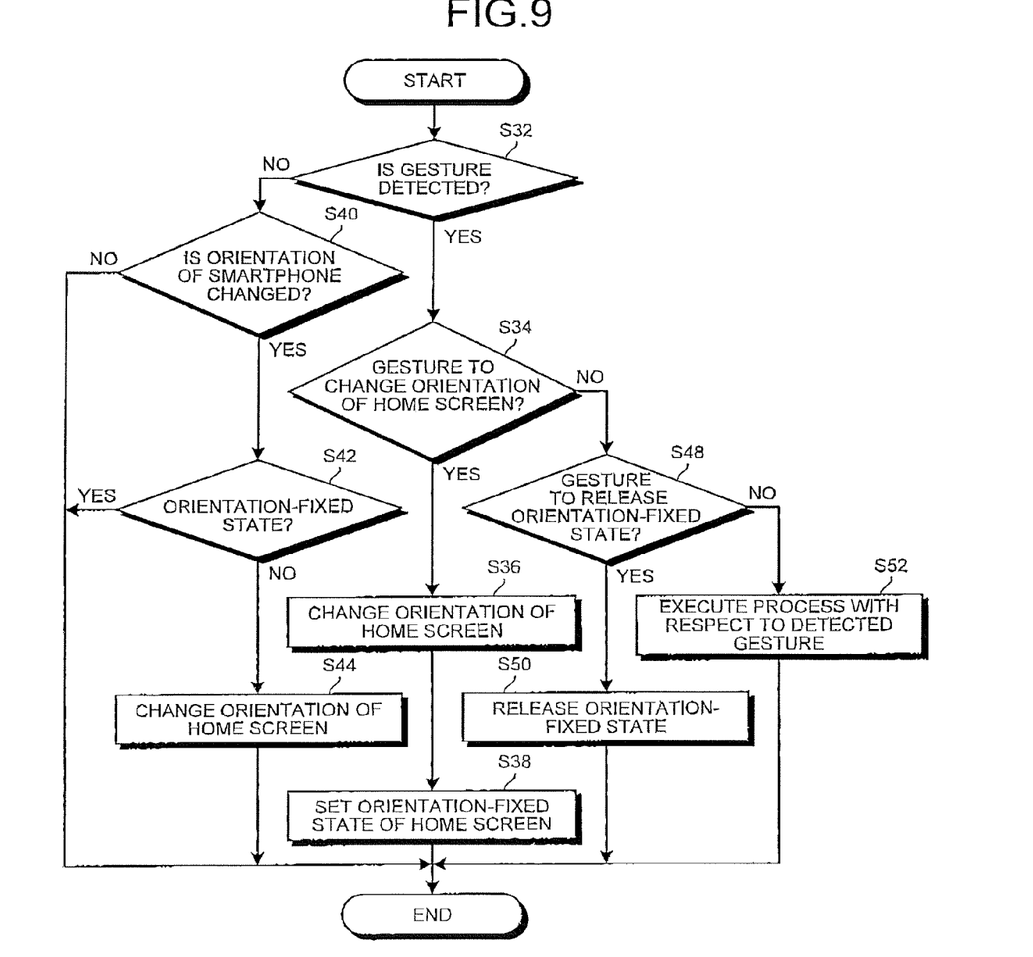
FIG. 9 is a flowchart illustrating another control processing procedure for changing the orientation of a screen.

As illustrated in FIG. 9, when the gesture to change the orientation of the home screen is detected, the smartphone 1 changes the orientation of the home screen and sets the orientation-fixed state. As described in the processing procedure of FIG. 9, the orientation-fixed state is a state where the orientation of the screen is not changed even if the change of the inclination of the smartphone 1 is detected. Accordingly, when the user actively sets the orientation of the home screen through an input of the gesture to change the orientation of the home screen to the touch screen display 2, the unintended change of the orientation of the home screen, which occurs due to the detection of the change of the inclination of the smartphone 1, can be limited.

As described above, the smartphone 1 can change the orientation of the home screen with a user's simple operation, and limit the occurrence of the change of the orientation of the home screen that is not intended by the user. Accordingly, by inputting the gesture to change the orientation of the home screen onto the touch screen display 2 and determining the orientation of the home screen to set the orientation-fixed state, the user can limit the unintended change of the orientation of the home screen even if the smartphone 1 is in a lying state in which the orientation of the smartphone 1 is variously changed.

When the gesture to change the orientation of the home screen is detected through the touch screen 2B even in the orientation-fixed state, the smartphone 1 changes the orientation of the home screen. Accordingly, the user can change the orientation of the home screen even in the orientation-fixed state.

In the above-described embodiment, when the gesture to change the orientation of the home screen is detected, the smartphone 1 does not change the orientation of the screen (shifts to the orientation-fixed state) depending on the inclination of the smartphone 1. However, the processing is not limited thereto. When the gesture to change the orientation of the home screen is detected, the smartphone 1 only have to limit the change of the screen orientation depending on the inclination of the smartphone 1. That is, as the process at Step S38, the smartphone 1 may perform various processes to limit the change of the screen orientation depending on the inclination of the smartphone 1 other than the process to set the orientation-fixed state. As the limit of the change of the screen orientation depending on the inclination of the smartphone 1, the limit other than the process not to change the orientation of the screen may be used. For example, the change of the screen orientation may be made difficult through the increase of the inclination of criteria in the orientation of the screen depending on the inclination of the smartphone 1.

In the case where the home screen as illustrated in FIG. 8 is displayed, the smartphone 1 performs the process of FIG. 9, and thus the user can simply change the orientation of the home screen and further the change of the orientation of the home screen to the orientation unintended by the user can be limited. Even in the case where a screen other than the home screen 40 is displayed on the display 2A of the touch screen display 2, the smartphone 1 may perform the process of FIG. 9. Accordingly, even in the case where the screen other than the home screen 40 is displayed, the user can simply change the orientation of the home screen and the change of the orientation of the home screen, which is not intended by the user, can be limited.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen display; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device comprising:
   a touch screen display configured to display a screen;
   a controller configured to control an orientation of the screen based on a touch gesture detected through the touch screen display and a state of the device; and
   a sensor configured to detect an inclination of the device as the state of the device, wherein
   the controller is configured to, when a first touch gesture is detected:
      change the orientation of the screen according to the state of the device,
      add a limitation on the change of the orientation of the screen according to the inclination of the device detected by the sensor, and
      increase difficulty to change the orientation of the screen through increasing an inclination of a criteria on which the orientation of the screen is determined depending on the inclination of the device, and
   when a second touch gesture is detected after the first touch gesture, the controller releases said limitation.

2. The device according to claim 1, wherein
   the limitation to change the orientation of the screen comprises locking the screen orientation.

3. The device according to claim 1, wherein
   the controller is configured to detect whether or not an angle of inclination of the device with respect to a horizontal direction is smaller than a threshold as the state of the device through the sensor.

4. The device according to claim 3, wherein
   when the gesture is detected and the angle is smaller than the threshold,
   the controller is configured to change the orientation of the screen.

5. The device according to claim 3, wherein
   when the gesture is detected and the angle is not smaller than the threshold,
   the controller is configured not to change the orientation of the screen.

6. The device according to claim 3, wherein
   when the angle is smaller than the threshold,
   the controller is configured not to change the orientation of the screen based on the inclination of the device detected by the sensor.

7. The device according to claim 1, wherein
   when a gesture for releasing the limitation is detected in a state where the limitation is added on the change of the orientation of the screen depending on the detection of the sensor,
   the controller is configured to release the limitation.

8. The device according to claim 1, further comprising a sensor for detecting an inclination of the device as the state of the device, wherein
   the controller displays the screen in an orientation in which a side that is a lowermost side in a vertical direction of the touch screen display and is nearer to a horizontal direction corresponds to a lower side of the screen based on the inclination of the device detected by the sensor.

9. The device according to claim 1, wherein the controller is configured such that, when the first touch gesture is detected, the screen is rotated either clockwise or counterclockwise and then the rotation is locked, and when the second touch gesture is detected while the screen rotation is locked, the screen is unlocked and will rotate based on the angle of inclination of the device.

10. A device comprising:
    a touch screen display for displaying a screen; and
    a controller for controlling an orientation of the screen based on a touch gesture detected through the touch screen display and a state of the device, wherein
    the gesture is a gesture of swiping and rotating two objects in the same direction on the touch screen, and
    the controller is configured to, when a first touch gesture is detected:
       change the orientation of the screen according to the state of the device,
       add a limitation on the change of the orientation of the screen according to the inclination of the device detected by the sensor, and
       increase difficulty to change the orientation of the screen through increasing an inclination of a criteria on which the orientation of the screen is determined depending on the inclination of the device, and
    when a second touch gesture is detected after the first touch gesture, the controller releases said limitation.

11. The device according to claim 10, wherein
    the controller is configured to change the orientation of the screen in a rotating direction of the gesture of rotating.

12. The device according to claim 1, wherein
    the sensor is an acceleration sensor.

13. The device according to claim 1, wherein
the screen is a home screen on which at least one icon is displayed.

14. A method for controlling a device including a touch screen display, the control method comprising:
displaying a screen on the touch screen display;
detecting an inclination of the device using a sensor;
when a first touch gesture on the touch screen display is detected, using a controller to change an orientation of the screen of the touch screen display depending on the inclination of the device; and
then using the controller to lock the orientation of the screen, based on the inclination of the device, wherein when the first touch gesture is detected:
add a limitation on the change of the orientation of the screen according to the inclination of the device detected by the sensor, and
increase difficulty to change the orientation of the screen through increasing an inclination of a criteria on which the orientation of the screen is determined depending on the inclination of the device, and
when a second touch gesture is detected after the first touch gesture, remove said limitation.

15. The method according to claim 14, wherein
the detecting includes detecting an inclination of the device, and
the changing includes changing an orientation of the screen depending on the inclination detected at the detecting.

16. The method according to claim 15, wherein
the changing includes limiting the change of the orientation of the screen depending on the inclination when the gesture is detected.

17. The method according to claim 14, wherein when the first touch gesture is detected, the screen is rotated either clockwise or counterclockwise and then the rotation is locked, and when the second touch gesture is detected while the screen rotation is locked, the screen is unlocked and will rotate based on the angle of inclination of the device.

18. A non-transitory storage medium that stores a program for causing, when executed by a device including a touch screen display, the device to execute:
displaying a screen on the touch screen display;
detecting an inclination of the device using a sensor;
when a touch gesture on the touch screen display is detected, using a controller to change an orientation of the screen of the touch screen display depending on the inclination of the device; and
then using the controller to lock the orientation of the screen, based on the inclination of the device, wherein when a first touch gesture is detected, the controller:
adds a limitation on the change of the orientation of the screen according to the inclination of the device detected by the sensor,
increases difficulty to change the orientation of the screen through increasing an inclination of a criteria on which the orientation of the screen is determined depending on the inclination of the device, and
when a second touch gesture is detected after the first touch gesture, the controller releases said limitation.

19. The non-transitory storage medium that stores the program according to claim 18, wherein
the detecting includes detecting an inclination of the device, and
the changing includes changing an orientation of the screen depending on the inclination detected at the detecting.

20. The non-transitory storage medium that stores the program according to claim 19, wherein
the changing includes limiting the change of the orientation of the screen depending on the inclination when the gesture is detected.

* * * * *